United States Patent Office 3,436,651
Patented Apr. 1, 1969

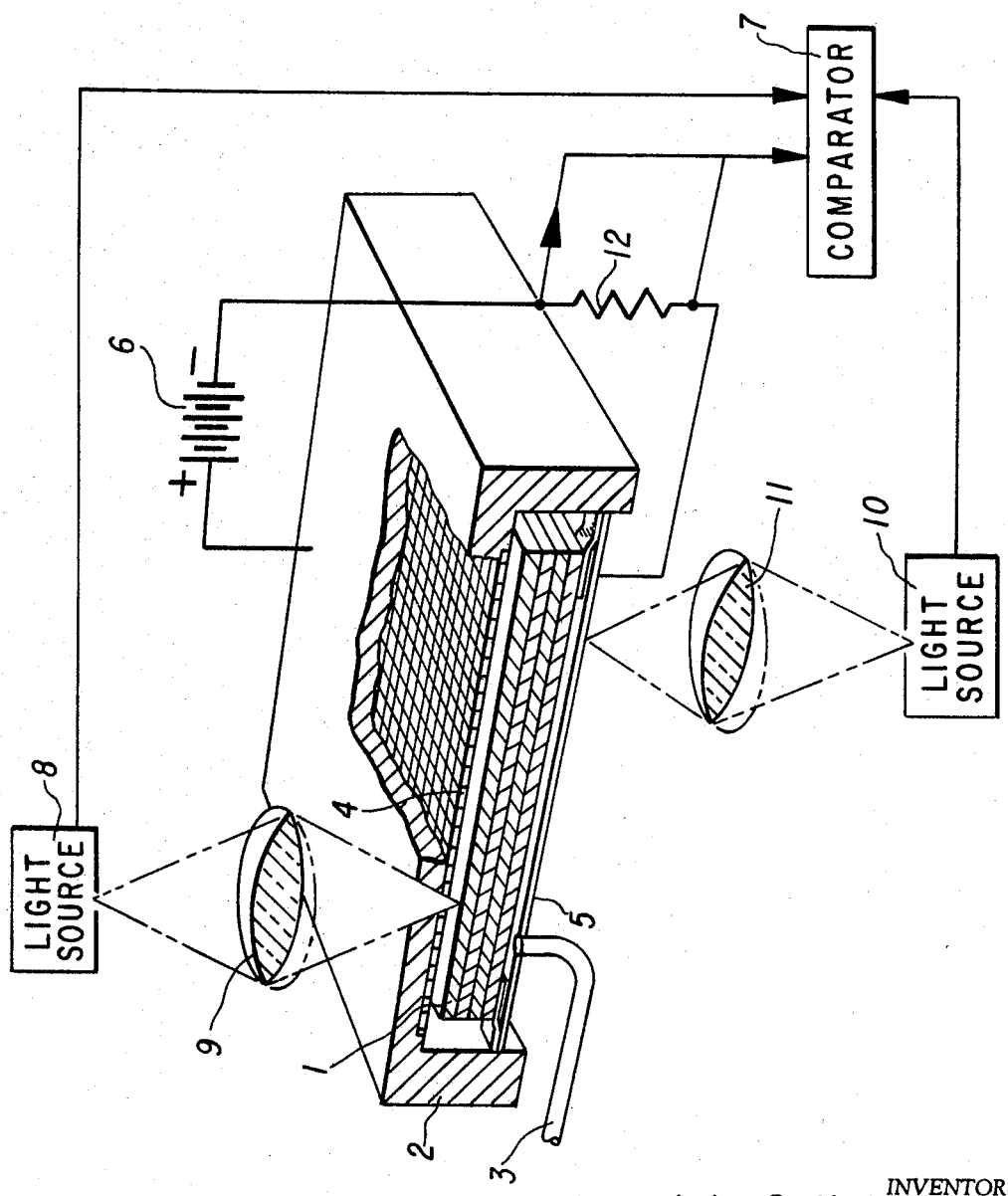

3,436,651
ELECTRONIC METHOD AND APPARATUS UTILIZING PHOTOEMISSIVE MEANS FOR TESTING CIRCUIT BOARD CONTINUITY
John D. Helms and Charles S. Williams, Dallas, Tex., assignors to Texas Instruments Incorporated, Dallas, Tex., a corporation of Delaware
Filed Dec. 23, 1966, Ser. No. 604,341
Int. Cl. G01r 31/02
U.S. Cl. 324—51                                                6 Claims

ABSTRACT OF THE DISCLOSURE

Disclosed is a method and apparatus for testing the continuity of the conducting leads of a circuit board by placing the board in an evecuated chamber between a photoemissive cathode and a charged grid; depleting electrons on one portion of the lead to be tested by radiating light energy of a suitable wavelength thereon, the electrons emitted from the circuit board being attracted to the charged grid; supplying electrons to another point on the board by radiating light on the portion of the photoemissive cathode over that point; and testing to determine whether a current flows between the photoemissive cathode and the charged grid. If the current does flow, continuity between the two points on the circuit board is indicated.

This invention relates to a contactless method and apparatus for testing for electrical continuity between points on a body by depleting electrons from one point on said body and supplying electrons to another point on said body. More particularly, the invention relates to a contactless method and apparatus for testing for electrical continuity between points on a circuit board by interrogating with beams of radiant energy.

A circuit board comprises a thin conductive circuit-forming layer composed of one or more conductive materials such as copper or nickel, attached to an insulating board or substrate such as an epoxy-impregnated fiberglass sheet. A multi-layer circuit board consists essentially of several such conductive layers separated by insulating sheets and bound together so that the various conductive layers are electrically connected. This is generally accomplished by plating through holes in the boards to join the various conducting layers, although other methods of forming the interconnections between the layers may be employed.

The testing of multi-layer circuit boards is currently a lengthy process. Since every point represents a potential short or open, the circuitry must be checked point against point. The determination of continuity in selected paths represents an added complexity for this process. Apparatus for contacting circuit boards with pressure probes presently in use, referred to in the art as "iron maidens," comprises blocks of spring-mounted contacts which are applied to the surface of a circuit board and selectively switched and compared to a logic system for testing. This method is expensive since a new block must be constructed for each new board designed. Moreover, the pressure of many probes may deform the circuit board.

It is therefore an object of the present invention to provide a method for testing circuit boards which is both contactless and rapid. A further object is to provide a method for testing circuit boards utilizing known techniques of testing by recording and comparing a signal.

In accordance with this invention, the circuit board under test is mounted in a vacuum chamber between a positively charged grid and a photocathode which are connected to external circuitry. A signal between conduction paths in the circuit board occurs when the photocathode is illuminated in close proximity to a first contact point which is connected to a second contact point on the opposite surface of the circuit board. Light having a wavelength which causes the contact material to emit electrons is focused upon the second contact. The passage of electrons to the positively charged grid creates a charge depletion which is filled by the electrons emitted by the photocathode and results in a current flow through the circuit. This signal, together with the position of each light source, is then compared through an associated logic system or comparator and memory containing the positional and electrical parameters for the circuit board. Thus, the comparator is able to determine whether the signal indicates continuity in a desired circuit, or indicates a short. Conversely, if no signal is obtained, the comparator can recognize whether the absence of a signal indicates a non-continuity in a desired circuit or between two points which should be electrically isolated. By repeating the testing process for selected points on the circuit board, the comparator ascertains the presence or absence of signals, and thereby the quality of the connections in the circuit board.

Other objects, features, and advantages of the present invention will become more readily understood from the following description when read in conjunction with the appended claims and attached drawing in which the sole figure illustrates apparatus suitable for practicing the method of the invention.

The figure depicts the circuit board 1 to be tested which is mounted in a testing chamber 2, provided with a vacuum line 3. The chamber is made of an insulating material which transmits radiant energy of the wavelength employed, a suitable example being quartz. The circuit board divides the chamber into two parts, an upper and lower part. A positively charged grid 4 is located in the upper part of the chamber. This grid may be a thin film of metal deposited in pattern form on the inner side of the chamber roof. A photocathode 5 is positioned in the lower part of the chamber, with the circuit board supported a slight distance above the photocathode. The grid 4 and photocathode 5 are connected to external circuitry 6 leading to a comparator 7. Light from source 8, passing through lens 9, is focused to illuminate a first contact point. The light from source 8 is of appropriate wavelength to generate the photoemission of electrons from the metallic circuit board conducting lead material. Light from a second source 10, passing through lens 11, is focused to illuminate a spot on the photocathode adjacent a second point on the opposite surface of the circuit board, to be tested in relation to the first point. The light of source 10 is of appropriate wavelength to cause the photocathode surface to emit electrons.

In testing the circuitry of a board, the chamber is first evacuated to a vacuum low enough to preclude conduction of electrons by ionized gases, i.e. a pressure on the order of $10^{-3}$ torr or less. A point or contact on the upper surface of the board is illuminated with light of appropriate wavelength from source 8 to cause photoemission, e.g. 2200 to 2300 A. in the case of copper. This depletes the charge on all areas connected conductively to this point. By incorporating a voltage grid on this side of the board and energizing this grid to a positive potential, the electrons are collected. Photocathode 5 is positioned adjacent to the lower surface of the board. The distance between the circuit board and the photocathode must be about as small as the separation between contact points on the board, in order to obtain selective focusing of electrons caused to be emitted from the photocathode by the light from source 10 onto a particular point. The photocathode is then selectively illuminated opposite the point to be tested. If the circuit is electrically continuous, the electrons emitted by the photocathode 5 will flow from the photocathode through the depleted circuit to the grid 4 and a signal is transmitted through the power source 6 and the resistance 12, the voltage drop across said resistance being conducted to the comparator 7 and recorded therein. The resistance 12 in the circuit is used as a means for monitoring the current. The voltage drop across the resistance 12 is inversely proportional to the voltage drop across the circuit containing the photocathode and voltage grid, a zero voltage drop across the resistance 12 indicating an open circuit. Conversely, if current flows between two points which are not supposed to be connected, a voltage drop occurs across the resistance 12 and a short is indicated. By selectively programming the position of the light from each source, the presence of a desired circuit or of a short may be determined from the signal, increased current flow through the examined circuit between the photocathode and grid, as indicated by the voltage drop across resistance 12.

Both light sources 8 and 10 are electrically connected to the comparator 7 and are operated by it. The comparator contains within its memory the position of every point on both sides of the circuit board to be tested, and the information whether or not there should be electrical continuity between any two of them. By focusing light from source 8 on a point on the upper surface of the board and simultaneously scanning the photocathode at points adjacent the points on the opposite surface of the board, the comparator receives a series of signals or absences of signals relating to the electrical continuity between the point on the upper surface of the board and each of the points scanned on the opposite side. This information is then compared with the information stored within its memory, and through its logic circuitry describes the quality of the electrical connections. This process is repeated for each of the other points on the upper surface of the circuit board to be tested. The light beams may be controlled by an X–Y table device or by the type of device used in cathode ray tubes or television picture tubes.

Thus, it may be seen that the invention provides a method of testing circuit boards which is both contactless and rapid. The invention offers the further advantage of utilizing known techniques of testing by recording and comparing a signal. It is also apparent that the method and apparatus are readily adaptable to new circuit board designs. The only change necessary to accommodate different circuitry is the provision of a new memory for the comparator, which can be computer generated. Thus, the time-consuming process of building a new "iron maiden" and the expense of the associated special tooling and hardware are eliminated. Moreover, since the method involves no physical contact with the circuit board, there is no danger of damaging it during the testing process.

It is to be understood that the above-described embodiment of the invention is merely illustrative of its principles. While the invention has been described with respect to testing of multi-layer circuit boards, it is apparent that the method is equally applicable to testing for electrical continuity between two points on any body. The method is particularly desirable whenever the body is fragile or has a complex composition. It is also to be understood that the method is not limited to use with a comparator. A light source has been referred to as a means for stimulating the emission of electrons. However, other means may be chosen to effect the same result. Various other modifications may be devised by those skilled in the art without departing from the spirit and scope of the invention as defined by the appended claims.

What is claimed is:

1. The method of testing for electrical continuity between two points on a body comprising the steps of:
    (a) depleting electrons from a first point on said body by stimulating electron emission therefrom,
    (b) supplying electrons to a second point on said body by the emission of electrons from an electron emission means in spaced relation to said body to said second point,
    (c) attracting the electrons emitted from said first point to a charged conductor, and
    (d) measuring the electron emission from said charged conductor, whereby an electron flow indicates electrical continuity between said first and second points and the non-existence of an electron flow indicates no electrical continuity between said first and second points.

2. The method according to claim 1 wherein said electron emission employs a photocathode.

3. A method of testing for electrical continuity between two points on a circuit board by interrogating said circuit board with a beam of radiant energy, comprising the steps of:
    (a) placing the circuit board in an evacuated, electrically insulating chamber,
    (b) selectively illuminating a first point on one surface of said board with light of suitable wavelength to effect photoemission of electrons from said first point,
    (c) collecting the emitted electrons on a voltage grid connected to a comparator,
    (d) scanning a photocathode electrically connected to the comparator with a light of suitable wavelength to cause photoemission of electrons onto a second point on said circuit board, said photocathode being in close proximity to all points on the opposite surface of the circuit board, and
    (e) recording the signal produced by said photoemission in the comparator.

4. Apparatus for testing electrical connections in a circuit board comprising:
    (a) an electrically insulating chamber,
    (b) a photoemissive cathode positioned within said chamber,
    (c) a voltage grid also positioned within said chamber in spaced relation with said photoemissive cathode,
    (d) means for maintaining said voltage grid at a positive potential with respect to said photoemissive cathode,
    (e) a first light source to stimulate emission of electrons,
    (f) a second light source to illuminate a portion of said photoemissive cathode, and
    (g) means to detect a flow of electrons between said photoemissive cathode and said voltage grid, whereby upon placing a circuit board in said chamber in spaced relation between said voltage grid and said photoemissive cathode, light from said first light source stimulates the emission of electrons from a first point on said circuit board, and light from said second light source illuminates a portion of said photoemissive cathode thereby to cause electrons emitted therefrom to fall upon a second point on said circuit board, the current produced by the electrons from said photoemissive cathode to said grid flows through said detecting means to indicate electrical continuity between said first and said second points on said circuit board, the absence of current through said detecting means indicating electrical non-continuity between said points.

5. Apparatus as defined in claim 4 wherein said chamber comprises quartz.

6. Apparatus as defined in claim 4 including a comparator and circuitry connecting said comparator with said voltage grid and said photocathode.

References Cited

UNITED STATES PATENTS

| 3,373,353 | 3/1968 | Harris | 324—54 |
| 3,086,119 | 4/1963 | Fomenko | 250—211 XR |
| 3,321,659 | 5/1967 | Brody | 250—213 XR |

RUDOLPH V. ROLINEC, *Primary Examiner.*

G. R. STRECKER, *Assistant Examiner.*

U.S. Cl. X.R.

324—96; 250—211